P. BROWN.
JOURNAL BOX.
APPLICATION FILED SEPT. 27, 1912.
1,155,040.
Patented Sept. 28, 1915.
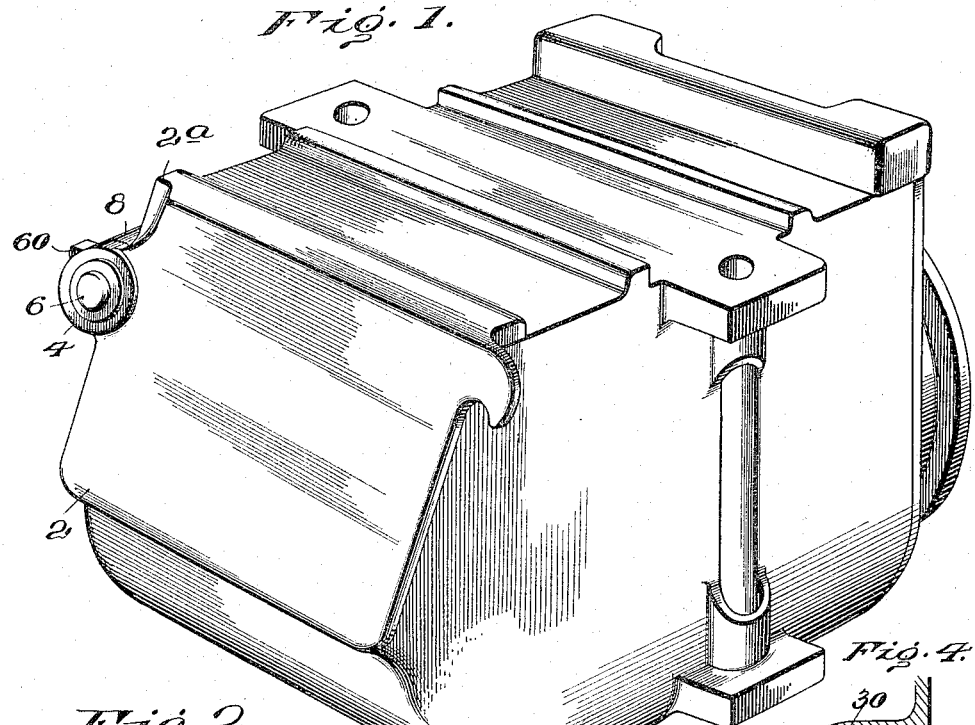
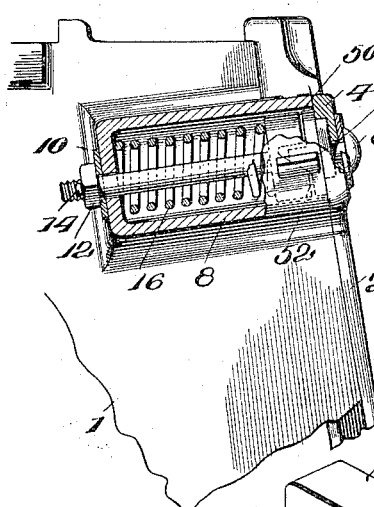
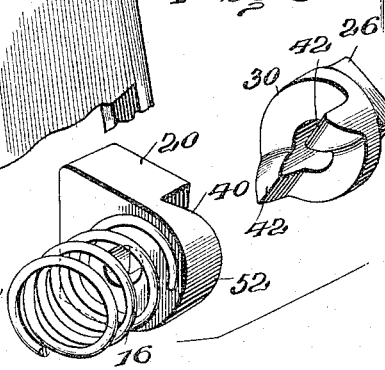
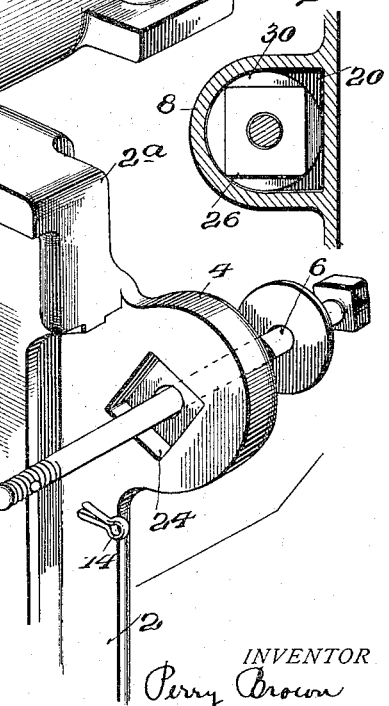
WITNESSES
W. A. Williams
H. S. Imirie
INVENTOR
Perry Brown
By Robertson & Johnson
Attorneys

UNITED STATES PATENT OFFICE.

PERRY BROWN, OF CORAOPOLIS, PENNSYLVANIA.

JOURNAL-BOX.

1,155,040.  Specification of Letters Patent.  Patented Sept. 28, 1915.

Application filed September 27, 1912. Serial No. 722,753.

*To all whom it may concern:*

Be it known that I, PERRY BROWN, a citizen of the United States, and a resident of Coraopolis, in the county of Allegheny and State of Pennsylvania, have invented certain new and useful Improvements in Journal-Boxes, of which the following is a specification.

This invention relates to improvements in hinges for journal boxes and more particularly to that style of hinge which will be capable of forcing the door entirely closed should the oiler or attendant fail to close it.

The invention consists in the device shown in its preferable embodiment in the accompanying drawings and as hereinafter pointed out in the appended claims.

In the aforesaid drawings: Figure 1 is a perspective view of a journal box having my invention applied thereto. Fig. 2 is a side elevation of the invention showing the novel parts in vertical section. Fig. 3 is a perspective view showing the various parts detached in order to better illustrate them. Fig. 4 is a detail showing the interior of the casing for the spring; the lid and its boss being removed.

Referring now to the details of the drawings by numerals: 1 represents a box such as is now commonly used having a lid 2 pivotally connected thereto near its upper left hand corner. The lid is preferably provided with a projecting boss 4 through which projects the hinge pin 6 to connect the boss of the lid to the box. The side of the box is provided with a casing 8 preferably of considerable length as indicated in Fig. 2 and the aforesaid hinge pin 6 after being passed through the boss 4 passes through the entire length of the casing 8 and through an opening in the rear thereof, a washer 10 and nut 12 being employed to hold the bolt in position. A cotter 14 is also preferably employed to act as a nut lock to prevent the nut 12 from turning with respect to the bolt 6. The interior of the casing 8 is preferably of irregular contour—as shown, it is D-shape—and after the spring 16 is inserted within the opening in the casing 8, a cam washer 20 is inserted on the end of the spring 16. This cam washer it will be observed is also D-shape to fit the D-shape interior of the casing 8 so that the cam washer 20 cannot possibly turn within the casing 8. The inner side of the boss 4 is provided with an opening 24 preferably rectangular in shape to receive the end 26 (also preferably rectangular in shape) of a second cam washer 30. Owing to the fact that the end 26 of the cam washer 30 fits within the rectangular recess 24 on the boss 4, it follows that whatever movement is given to the lid 2 on its hinge or pintle 6, the cam washer 30 must necessarily turn with the boss 4 of said lid. The cam washer 20 is provided with cam surfaces 40 forming recesses within which fit cam projections 42 on the side of the cam washer 30.

The construction just described is such that when the parts are assembled as illustrated in Fig. 2, the spring 16 causes the two cam washers 20 and 30 to normally occupy the position shown in Fig. 2 so that the cam projections 42 on the cam washer 30 are located within the recesses formed by the cam surfaces 40 on the D-shaped cam washer 20. Whenever the lid 2 is opened the boss is necessarily turned upon the hinge or pintle 6 so that the cam washer 30 is given a turning movement with respect to the cam washer 20 the latter being held from rotary movement within the D-shaped interior of the casing 8. Of course it will be understood that in the act of turning, the D-shaped cam washer 20 will be forced against the position of the spring 16, into the casing 8 sufficiently to permit the cam projections 42 to ride upon the cam surfaces 40 of the cam washer 20. If the door is opened sufficiently to cause said cam projections 42 to ride upon the flat parts 50 and 52 of the cam washer 20, then the door will remain in the position to which it has been opened, but just as soon as the operator moves the door in the opposite direction sufficiently to have the cam projections 42 engage the cam surfaces 40, the stiff spring 16 will cause the D-shape cam washer 20 to coact with the cam washer 30 and force the projections 42 down into the recesses of the cam washer 20 until they reach the position shown in Fig. 2 when the door will be entirely closed.

I am aware that it is common to provide devices for closing the lids of journal boxes and therefore do not claim said devices broadly, but I believe that I am the first to provide a device of this kind wherein two cam washers are employed which are of such construction that they may very easily be removed and replaced by new ones should they become worn or damaged.

In order to prevent the lid 2 from being opened too far, I form a stop 60 (see Fig. 1) on the exterior of the casing 8, and this stop is so located that the upper corner $2^a$ of the lid 2 will contact therewith and thus prevent the lid from being opened too far.

What I claim as my invention is:

1. The combination in a journal box, of a casing on the side of the box running longitudinally of the box, a lid hinged to said casing at one side thereof, a bolt passing through said lid and through the casing, a detachable cam washer on said bolt rotatable with said lid as the lid is opened and closed, a non-rotatable cam washer on said bolt, and a spring in said casing holding the said cam washers in coöperative relationship, whereby when the lid is opened one of the said cam washers rotates with respect to the other and forces said other cam washer against the spring.

2. The combination in a journal box, of a casing on the side of the box running longitudinally of the box, a lid hinged to said casing at one side thereof, a bolt passing through said lid and through the casing and forming the pivot of the hinge, a cam washer on said bolt, said lid and said cam washer having co-acting surfaces causing the same to move in unison as the lid is opened and closed, a second cam washer on said bolt movable longitudinally of the bolt with respect to the other cam washer but non-rotatably held on the bolt, and a spring in said casing holding the said cam washers in coöperative relationship, whereby when the lid is opened one of the said cam washers rotates with respect to the other and forces said other cam washer against the spring.

3. The combination in a journal box, of a casing on the side of the box running longitudinally of the box, a lid hinged to said casing and having an irregular shaped recess around its pivotal point, a bolt passing through said lid and through the casing, a cam washer on said bolt having a projection entering the irregular recess in the lid and thereby moving with said lid as the lid is opened and closed, a non-rotatable cam washer on said bolt movable longitudinally of the bolt, and a spring in said casing holding the said cam washers in coöperative relationship, whereby when the lid is opened one of the said cam washers rotates with respect to the other and forces said other cam washer against the spring.

In testimony whereof I affix my signature in presence of two witnesses.

PERRY BROWN.

Witnesses:
JOHN L. FLETCHER,
H. S. IMIRIE.